Jan. 14, 1930.　　C. M. WATROUS　　1,743,944
WHEEL FOR TOYS
Filed May 8, 1924
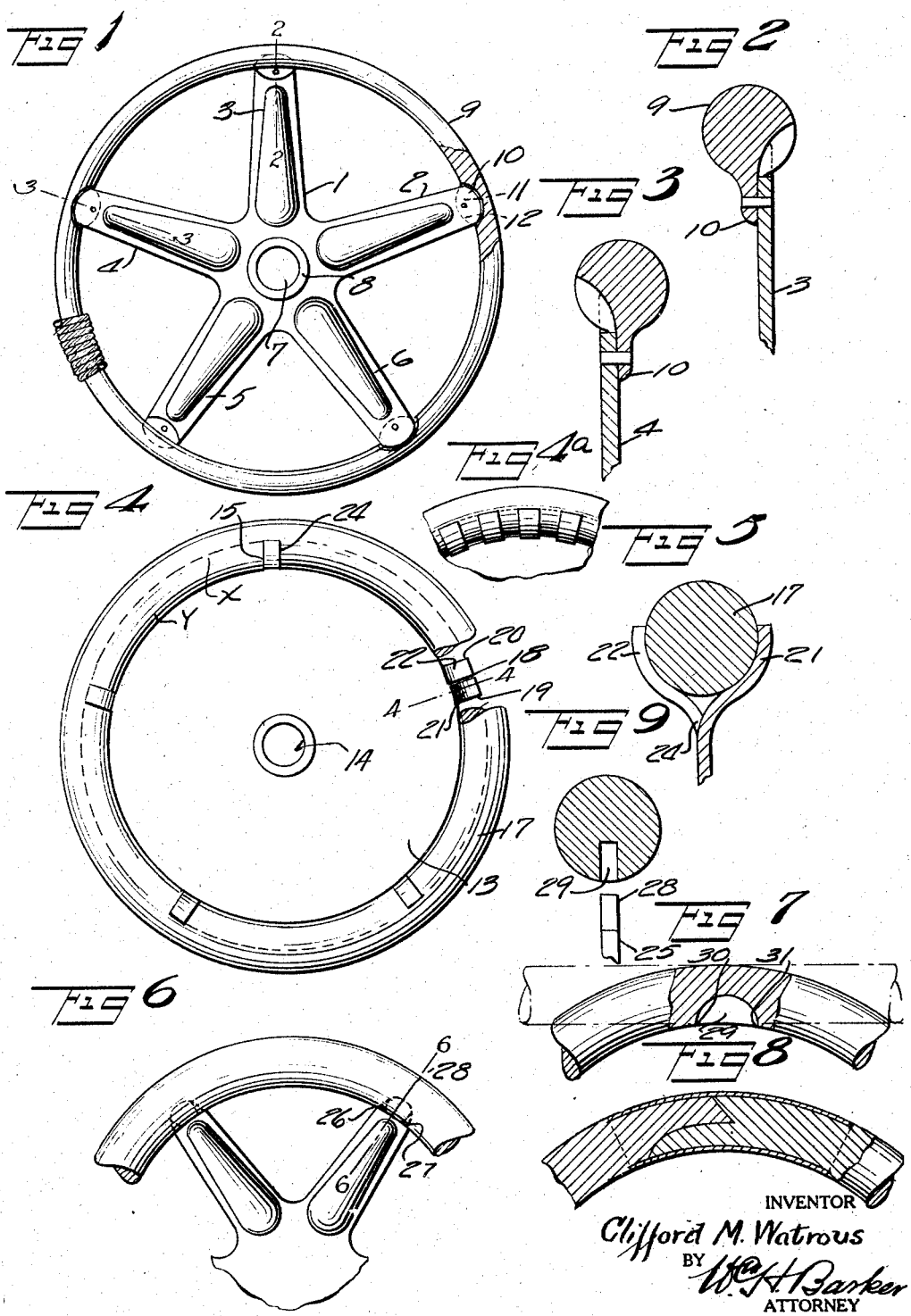
INVENTOR
Clifford M. Watrous
BY W. H. Barker
ATTORNEY Patented Jan. 14, 1930

1,743,944

UNITED STATES PATENT OFFICE

CLIFFORD M. WATROUS, OF EAST HAMPTON, CONNECTICUT, ASSIGNOR TO GONG BELL MANUFACTURING COMPANY, OF EAST HAMPTON, CONNECTICUT, A CORPORATION OF CONNECTICUT

WHEEL FOR TOYS

Application filed May 8, 1924. Serial No. 711,826.

The invention relates to wheels and is particularly well adapted for use on toys where the cost must be cut down to a minimum in production, and at the same time give certain features of strength and appearance which are necessary for so called wheel toys.

When used in the manufacture of toys, it is extremely desirable to simulate the appearance of vehicle and other wheels of modern types, and the wheel hereinafter described, may be adapted for the spoke type or the disc type of wheel, utilizing substantially the same elemental forms with slight modifications.

The object of the invention is to produce a wheel which will have smooth running qualities and may be made a productive element, with great uniformity, without requiring special machining and tooling, to provide accurate centering and smooth running treads.

A further object is to provide a composite structure, certain of the elements made from one material and others from a different material. This gives a selective feature with a certain element of variations in artistic appearance which is especially desirable in toy manufacture.

Heretofore toy wheels have been commonly cast with the attendant objections of rough surfaces, to say nothing of the labor charge for centering, machining, trimming, etc.

It is largely to overcome such difficulties that the present invention is proposed, and wheels made, as herein described, can be produced on a most economical basis and of a substantially perfect form, providing great ease of assembly.

Referring to the drawings:

Fig. 1, is a view in elevation, of a wheel embodying the invention.

Fig. 2, is a cross sectional view through spoke and rim on an exaggerated scale on line 2—2 of Fig. 1.

Fig. 3, is a similar view through the next succeeding spoke of the wheel on line 3—3 of Fig. 1.

Fig. 4, illustrates a disk type of wheel.

Figure 4ª, is a fragmentary view showing progressive slitting of the disk.

Fig 5, is a partial section through the wheel and tire on line 4—4 of Fig. 4.

Fig. 6, illustrates a modified attaching means for the tire section.

Fig. 7, is a partially broken away section of a section of the tire, appurtenant to the spoke on line 6—6 of Fig. 6.

Fig. 8, illustrates one manner of joining the ends of the tire.

Figure 9, is a cross sectional illustrative view of the tire socket and spoke of Figs. 6 and 7.

In carrying out the present invention, it is proposed to provide for a composite structure of metal and other material such as reed or fibre or to make an entire metal wheel.

In Figs. 1 to 3 inclusive, an all metal wheel is illustrated.

In Figs. 4 and 5, there is an adaptation for all metal or metal and reed or fibre.

In Figs. 6 to 8, inclusive, either all metal or metal and fibre, or reed, may be employed.

In fact, the matter of material may be left to the requirements of any particular demand, and even the spoke and hub sections may be formed from fibre, or any suitable material, with either a metal or fibre tire, or a metal spoke and hub section may be employed with a metal, fibre or reed tire.

Referring to Figs. 1 to 3, a spider like hub and spoke section 1, is stamped out of suitable material, such as thin metal, and as illustrated, has a series of spokes 2, 3, 4, 5. These spokes may be reenforced or stiffened by suitable embossing as at 6, and of course, the blank is pierced as at 7, to provide an axle opening, the metal about the perforation, preferably being drawn somewhat, to provide a hub 8.

In order to provide a smooth running thread or tire, a rod or wire or piece of material of appropriate length, size and cross section, is bent into the form of a ring 9, and is joined to the spokes.

A wire of appropriate size may be conveniently used for small wheels and this is submitted to the action of a deforming die which throws out of the material, lugs 10, which may be spot welded to the ends of the spokes, where metal spokes are used, or they may be riveted or secured in any desired manner.

This deforming of the metal may take place while the wire or rod is in the "straight" or where it is held in circular form, with its ends abutting.

It should be quite obvious that a wheel, thus formed, may be produced on a most economical basis and will have all of the attributes of a perfectly formed wheel, with the attendant advantages of uniformity, smooth running tread and accurate centering.

The deformed portion, of the rim forming the lug 10, of Fig. 2, is made from one side of the wire or rod, while the lug 10, of Fig. 3, is deformed from the opposite side. This will bring the plane of the spoke spider more nearly in perfect line with the center of the tire. Although this is not an essential form, it has some features of desirability, and where the spokes are formed in number, as illustrated in Fig. 1 of the drawing, or of a greater number, the alternate spokes may be secured to correspondingly deformed lugs, swedged out from the same or opposite sides of the tire.

The latitude of manufacture in a wheel constructed, as defined, is very great, as it may be made in very small units, or comparatively large ones. The wire or rod forming the tire is, of course, of accurate dimensions, and provides a perfectly smooth running tread without requiring machining, of any sort, the spoke spiders may be formed with great accuracy on dies and the assembly of the spoke spiders and tires is an extremely simple operation, which can be performed by unskilled labor.

For toys, it is desirable to provide, in some instances, disk wheels to simulate the now commonly used disk type of wheel appearing on automobiles and commercial vehicles.

In Figs. 4 and 5, of the drawings, such a wheel is illustrated.

A disk 13, is pierced as at 14, to provide for attachment to an axle and this piercing may be drawn and extended to provide a hub. The peripheral edge of the disk is scarfed or split radially, as indicated at 15, 16, and in fact, wherever it is desired to form connecting elements for the tire 17. The tire 17 may be of wire, reed, or other material, capable of being bent into circular form and of appropriate cross section.

The scarfing of the edge of the disk 13, may be made by forming three slits, 18, 19, 20, which will leave, between the slits, securing elements 21, 22. These elements 21, 22, are forced to opposite sides of the plane of the disk and provide, what is in effect, a broken groove about the rim of the disk in which case the metal is removed between the outside slittings.

The reed or wire is bent to circular form and inserted in the clips, forming the groove, and the offset portions 21, 22, are bent securely back to partially encircle and hold the tire. The reed or wire of circular form provides both a felloe and tread or tire for the wheel when in place.

In lieu of arranging the slitting at immediate points about the peripheral edge, the entire edge of the disk may be slit and the alternate slit portions turned to opposite sides of the plane of the disk, giving what is in effect, a continuous groove for the tire. This is shown in fragmentary view in Figure 4ª.

Of course, the first stamping of the disk provides a disk of the diameter illustrated at X, Fig. 4, but the final diameter of the disk portion, when the edge of the disk is slit, is represented by Y, the holding clips for the tire extending beyond the edge Y, in case the slitting occurs at intervals.

The reed or wire tire will rest directly upon the peripheral surfaces Y, and be clamped by the clips, formed by the offset portions 21, 22.

In Figs. 6 to 9, of the drawings, there is illustrated a slightly modified attaching means as between the spokes and the tire. In this case, the spokes are formed with shoulders 26, 27, and an extended lug 28.

The tire of appropriate size and material is milled out at intervals as at 29, in the central plane of its axis, to provide pockets into which the lugs 28, of the spokes project.

Where this milling is effected with the tire material in a straight rod or wire, a bending of the milled tire piece into the form of a circle, draws together the edges of the milled cut 30, 31, and this gives a clamping action on the lugs 28, taking up any possible inaccuracy of "fit."

The ends of the tire element may be scarfed in any desired manner so that they will fit snugly together, as illustrated at Figure 8, and may be secured in place by a suitable ferrule, or may be riveted, spot welded, or otherwise secured together.

The arrangement of the split ends of the spokes would, of course, be the same as illustrated and described in connection with the disk wheel of Figure 4. That is, the two split ends of the spokes would be offset from opposite sides of the plane of the spoke spider to engage and clamp opposite sides of the circular wire or reed forming the tire.

This means of securing the tire is extremely economical as it requires no welding or riveting and does away with certain operations.

An entire structure can be completely assembled by the action of dies and presses, and thus gives a product of great uniformity with accuracy. The adjoining ends of the tire element may be clamped together in the clip or clamped to the spoke end or disk, just as the adjoining ends with the lug are spot welded or otherwise secured to the spoke as described in connection with Figure 1.

One of the great advantages of the use of a tire element of fixed character, such as a rod or wire or reed, resides in the possibility of using comparatively small wires and winding these about with a covering, to give the enlarged effect of a pneumatic tire.

The invention herein described is somewhat analogous to those of my co-pending applications, but has certain features of advantage not disclosed or described therein. Obviously, the present invention is subject to numerous modifications without departing from the spirit or intent of the invention disclosed.

What I claim as my invention and desire to secure by Letters Patent is:

1. A wheel for toys consisting of a single piece of metal stamped out in disk form, said disk slit as to its peripheral edge, the slit edges being formed to provide a continuous peripheral groove for a tire and adapted to clamp a tire from opposite sides thereof and a tire fitting within the groove so formed and clamped therein.

2. A wheel consisting of a disk of material stamped out to provide a hub and tire supporting elements, the peripheral portions of the tire supporting elements being slit and deformed to opposite sides of the plane of the disk and a tire of circular form clamped between the deformed portions to provide a felloe and tread for the tire.

CLIFFORD M. WATROUS.